United States Patent [19]

Mak

[11] Patent Number: 4,918,422
[45] Date of Patent: Apr. 17, 1990

[54] METHOD AND APPARATUS FOR EXTRACTING INBOUND INFORMATION GENERATED LINE-TO-LINE IN A MULTI-PHASE ELECTRIC DISTRIBUTION SYSTEM

[75] Inventor: Sioe T. Mak, St. Louis County, Mo.

[73] Assignee: Emerson Electric Co., St. Louis, Mo.

[21] Appl. No.: 185,792

[22] Filed: Apr. 25, 1988

[51] Int. Cl.⁴ .............................................. H04B 3/56
[52] U.S. Cl. .................................. 340/310 R; 307/3; 340/310 A
[58] Field of Search ........ 340/310 A, 310 R, 310 CP; 370/71; 375/37, 41, 42; 455/46, 59, 60, 137, 139, 202, 39; 307/3

[56] References Cited

U.S. PATENT DOCUMENTS

| | | | |
|---|---|---|---|
| 3,689,841 | 9/1972 | Bello et al. | 375/41 |
| 4,106,007 | 8/1978 | Johnston et al. | 375/37 |
| 4,188,619 | 2/1980 | Perkins | 340/310 R |
| 4,217,467 | 8/1980 | Kobayashi et al. | 375/42 |
| 4,218,655 | 8/1980 | Johnston et al. | 375/22 |
| 4,254,402 | 3/1981 | Perkins | 340/310 R |

Primary Examiner—Joseph A. Orsino
Assistant Examiner—Brent A. Swarthout
Attorney, Agent, or Firm—Polster, Polster and Lucchesi

[57] ABSTRACT

Waveforms are derived from each primary of a multiphase electric distribution system, which derived waveforms include at least a carrier component. At least some of which derived waveforms include a signal component. The waveform of one of the primaries is adjusted in amplitude and phase so that the carrier components of the derived waveforms substantially cancel when the waveforms are summed together.

17 Claims, 3 Drawing Sheets

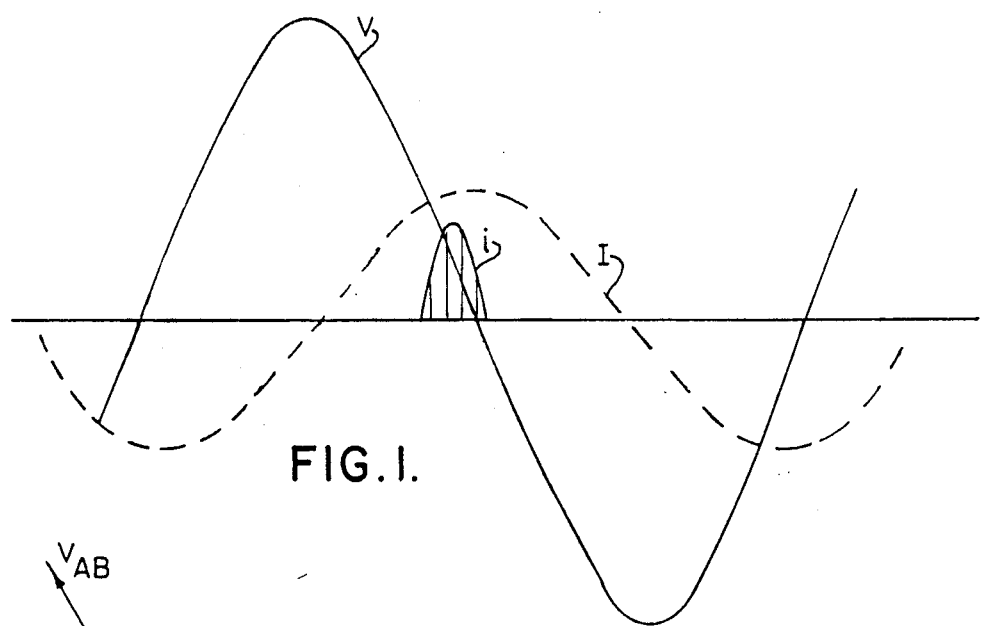
FIG. 1.
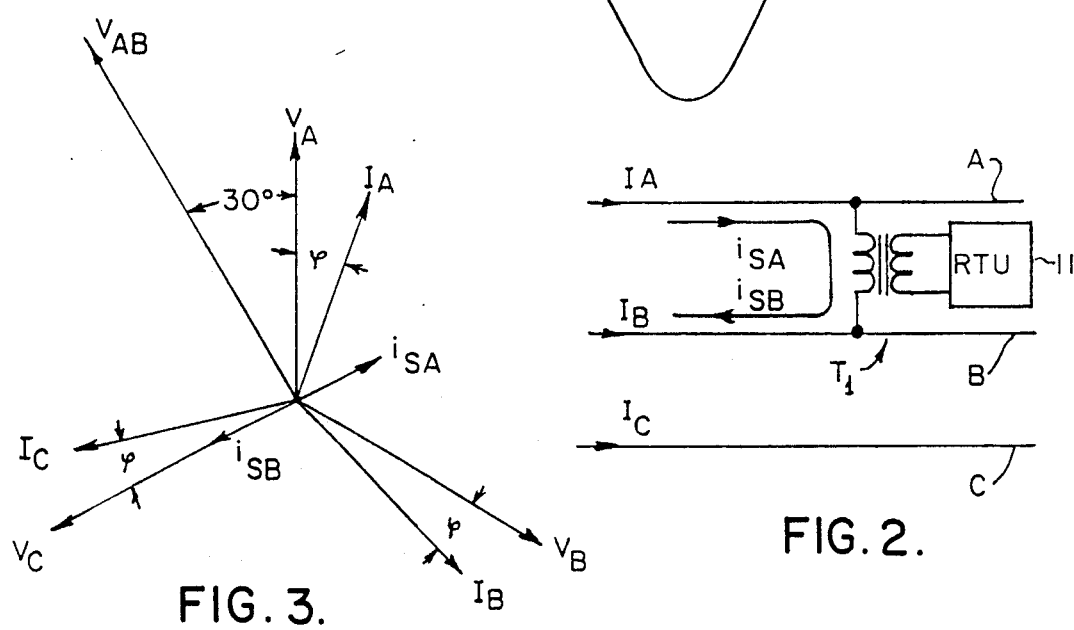
FIG. 3.
FIG. 2.
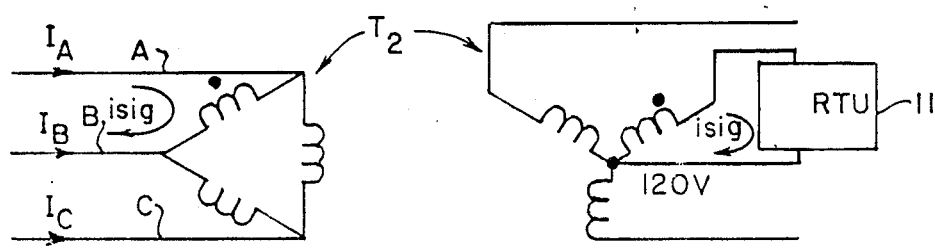
FIG. 4.

METHOD AND APPARATUS FOR EXTRACTING INBOUND INFORMATION GENERATED LINE-TO-LINE IN A MULTI-PHASE ELECTRIC DISTRIBUTION SYSTEM

BACKGROUND OF THE INVENTION

This invention relates to a system for extracting information from a carrier wave and relates generally to the method and apparatus described in U.S. Pat. Nos. 4,106,007 and 4,218,655, the disclosures of which are incorporated herein by reference. As described in those patents, it is known that a modulation voltage can be superimposed on a power system voltage, at specified locations on the power system voltage such as a zero crossing, to cause wave shape perturbations in the carrier wave. In the embodiment described hereinafter, the carrier wave is the voltage wave of an electrical power distribution system. Communication over electric power distribution lines is useful for signaling, meter reading, and load control, among other uses. However, communication over an electric distribution system is a complex undertaking. Each customer service constitutes a branch in the distribution feeder, and the branching is so extensive that it is impractical to provide filter and by-pass circuitry at each branch point. The distribution system is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first concerns transmitting information from the central source in the direction of energy flow to the individual customer premises. This transmission of information in the direction of energy flow is referred to as "outbound" signaling. Functions such as automatic meter reading and various alarm systems, however, require that information passes not only from a single source to the end user, but also from the end user back to the central station. This transmission of information in the direction opposite to that of the energy flow is referred to herein as "inbound" signaling.

For "outbound" signaling, in order to reach line-to-line customers on the three-phase distribution network of a utility, for example, the modulation signal which carries the information preferably should have dominant positive and negative sequence components. This implies that the outbound modulation signal should not appear on all three phases simultaneously at equal strength and phase relationship.

For inbound signaling, in a grounded neutral four-wire system, when the system is extremely well-balanced, the 60 Hz component of the neutral wire current is zero. The neutral wire current consists basically of third, fifth, seventh, and ninth harmonics only and the additive sum of all distortions of currents in all three phases of the system. Extraction of inbound signals or information in a reasonably well-balanced system where the signal appears line-to-neutral is fairly straightforward and tends to give excellent results. For line-to-line inbound signaling, however, the result is not so favorable. It is known that in those cases where a neutral wire of a three-phase system is not available, one can be synthesized by using current transformers and adding the currents in the three phases to synthesize the neutral. Unfortunately, in line-to-line inbound signaling, the signal current appears on at least two of the phases so that adding together the phase currents by means of current transformers tends to cancel out the signal current.

SUMMARY OF THE INVENTION

One of the objects of this invention is to provide a method and apparatus for improving the extraction of inbound information generated line-to-line in an electric distribution system.

Another object of this invention is to provide a highly reliable method and apparatus for extracting such information.

Another object is to provide a low-cost method and apparatus for improving the extraction of inbound information generated line-to-line in an electric distribution system.

Other objects and features of this invention will be apparent to those skilled in the art in light of the following description and accompanying drawings.

In accordance with this invention, generally stated, a waveform proportional to the current in one primary of the multi-phase electric distribution system is subtracted from a second waveform proportional to the current in a second primary to form a composite waveform. The waveforms each potentially contain an information component in addition to the pre-existing alternating wave on that primary. The composite waveform is combined with a waveform derived from the current in a third primary in such a way as to substantially cancel the pre-existing alternating waves of all three primaries without cancelling the information components.

Apparatus of the present invention for extracting inbound information generated line-to-line in a multiphase electric distribution system includes means for deriving waveforms from each primary from a multiphase electric distribution system. The derived waveforms include at least a carrier component, and at least some of the derived waveforms include a signal component. The apparatus also includes means for summing the waveforms derived from the primaries. The waveform deriving means includes means for adjusting the amplitude and phase of the waveform of at least one primary so that the carrier components of the derived waveforms substantially cancel.

BRIEF DESCRIPTION OF THE DRAWINGS

FIG. 1 is a voltage-current diagram illustrating one possible modulation system;

FIG. 2 is a schematic illustrating the currents involved in a typical line-to-line inbound communications system;

FIG. 3 is a phasor diagram of the voltages and currents in the system of FIG.2;

FIG. 4 is an electrical schematic illustrating another possible line-to-line inbound communications system;

Similar reference characters indicate similar parts throughout the several views of the drawings.

DESCRIPTION OF THE PREFERRED EMBODIMENT

A suitable signaling method for inbound and outbound communication over an electric distribution system is illustrated in FIG. 1. In this method, a current pulse "i" is shown injected near the zero crossing of the voltage of the 60 Hz system. Of course, the signal current could be injected at another suitable voltage level. In FIG. 1, and throughout the drawings, a capital letter indicates continuous voltages or currents, as appropriate, and small letters indicate pulses of short duration. The signal for the pulse labeled "i" is identical in sign and phase with the system current, labeled "I", but is of much shorter duration. Although only one signal pulse "i" is shown in FIG. 1, in practice it is desirable to inject pulses at a number of a zero crossings (e.g., four zero crossings) to better enable the signal to stand out from the noise.

A signal such as shown in FIG. 1 can be generated by the circuitry of FIG. 2. In that circuit, a remote transponder unit (RTU) 11 such as would be used to transmit inbound information concerning an electric meter reading, for example, drives a transformer T1 connected line-to-line between the A and B primaries of the electric distribution system. Since remote transponder unit 11 is connected line-to-line, the signal current $i_{sA}$ and $i_{sB}$ is divided between primaries A and B. That is, the signal current appears on buses A and B, but in opposite directions. As should be apparent, these two parts of the signal current are also equal in magnitude. In this particular signaling arrangement, bus or primary C carries no signal current.

The phasor diagram for the circuit of FIG. 2 is shown in FIG. 3. In this general case, the reference voltage is $V_{AB}$, which leads the voltage on bus A by thirty degrees. The signal current $i_{sA}$ on bus A lags the reference voltage $V_{AB}$ so that it is at the zero crossing of voltage $V_{AB}$. Voltage $V_A$, $V_B$, and $V_C$ are equal in magnitude but 120 degrees out of phase with respect to each other. Each bus current, $I_A$, $I_B$, and $I_C$, lags its associated voltage by the angle psi.

Such a phasor diagram could also be drawn for the circuit of FIG. 4, which illustrates the case where RTU 11 is connected across one winding of a three phase step-down transformer T2. In this case, as in the case of the single-phase step-down transformer of FIG. 2, the signal current is contained on the A and B buses and is equal in magnitude but opposite in sign on those two buses.

Figure 5:
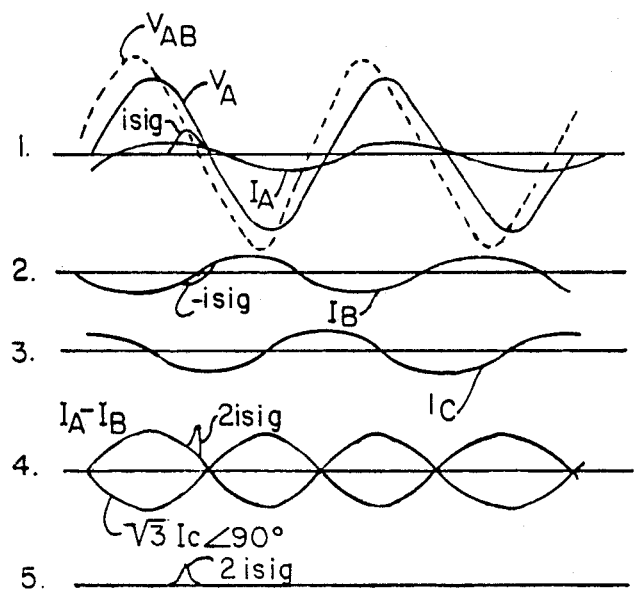
FIG. 5 is a diagrammatic view illustrating the voltages and currents present on all three phases of the systems of FIG. 2 and FIG. 4 as well as the current waveforms resulting from the present invention.

For both the circuits of FIG. 2 and FIG. 4, the net current in phase bus A during occurrence of the peak of the inbound signal pulse is the magnitude of the regular bus current $I_A$, at an angle of minus psi, plus the signal current on bus A, at an angle of minus thirty degrees. At the same time in phase bus B, the current is also made up of two components. The first is the carrier component which has the magnitude of $I_B$, but at an angle of minus psi minus 120 degrees. The second is $i_{sB}$, which is equal in magnitude to $i_{sA}$, but is opposite in sign. A diagram of these waveforms is shown in FIG. 5. For example, line 1 of FIG. 5 illustrates the reference voltage $V_{AB}$, the A bus voltage $V_A$, and the A bus current $I_A$, having superimposed thereon $i_{sig}$ at the zero crossing of the reference voltage $V_{AB}$. In line 2, the signal current is shown superimposed on the current $I_B$ on phase bus B, while the third line of FIG. 5 illustrates that the current of phase bus C contains no signal component. By subtracting the current on bus B from that on bus A, one obtains the curve labeled $I_A$ minus $I_B$ of line 4, FIG. 5, with two times $i_{sig}$ superimposed thereon. Although two times $i_{sig}$ appears to be significant on line 4 of this figure, it is actually exaggerated in size. It would be swamped by the current $I_A$ minus $I_B$, which would make it difficult, if not impossible, to detect. However, as the other curve on line 4 of this figure indicates, it is possible to change the magnitude and phase of the current on phase bus C of the system to cancel out the $I_A$ minus $I_B$ current, so that one is left with the two times $i_{sig}$ signal shown on line 5 of FIG. 5. One can determine the necessary modifications to the current in phase bus C by considering the following equations:

$$I_{tA} = I_A + i_{sA} = |I_\lambda| \angle -\Psi + |i_{s\lambda}| \angle -60°$$

This equation is obtained from FIGS. 3 and 5, where $I_{tA}$ is the net current in phase bus A during occurrence of the peak of the inbound pulse. Similarly, $$I_{tB} = I_B + i_{sB} = |I_\lambda| \angle -\Psi - 120° - |i_{s\lambda}| \angle -60°.$$

From FIG. 5 we want to change the magnitude of and phase shift the current in phase bus C, so $$I_{tc} = |K| \angle \alpha I_c = |KI_a| \angle -\Psi + \alpha + 120°,$$

where K and alpha are arbitrary constants.

Subtracting $I_{tB}$ and $I_{tc}$ from $I_{tA}$ gives $$I_{to} = (|I_A| \angle -\Psi - |i_{sA}| \angle -60°) - (|I_\lambda| \angle -\Psi - 120 - |_{s\lambda}| \angle -60°) + |K||I_{80}|\angle -\Psi + \alpha + 120°$$

or $$I_{to} = (|I_\lambda| \angle -\Psi - |I_\lambda| \angle -\Psi - 120° + |K||I_\lambda| \angle -\Psi + \alpha + 120°) + 2|i_{s\lambda}| \angle -60°$$

One can note from the above that the 60 Hz component of the instantaneous current can be cancelled out by selecting the magnitude of K and the angle alpha to make the first term in this last equation zero. In that first term, $$|I_\lambda| \angle -\Psi - |I_{80}| \angle -\Psi - 120° - \sqrt{3}|I_{80}| \angle +30° -\Psi$$

so that the net current equals $$I_{to} = (\sqrt{3}|I_\lambda \angle -\Psi + 30° + |K||I_\lambda| \angle -\Psi + \alpha + 120°) + 2|i_{s\lambda}| \angle -60°$$

Thus, to get the first term to cancel, the magnitude of K should be selected to equal the square root of three, and the angle alpha should be selected to equal ninety degrees. By adding a waveform modified in this manner to the difference in the currents in the A and B phases, one gets the signal shown on line 5 of FIG. 5, which is solely a function of the signal broadcasted by the remote transponder unit 11. Of course, using this arrangement, the third and ninth harmonics as well as the noise on the circuit still interfere with the signal, but the signal is no longer swamped in the much larger 60 Hz currents of the electric distribution system.

The method of detecting such a signal, therefore, includes three steps. Subtract the current in bus B from the current in bus A. Increase the current in bus C by a factor of the square root of three and phase-shift that current by ninety degrees. Lastly, add the increased and phase-shifted current in bus C to the current difference from the other two buses. Such a scheme is implemented in the circuitry of FIG. 6. Current transformers CT1 are connected with their primaries in series with phase buses A, B, and C, respectively, and their secondaries are connected in parallel with a resistance R. With this arrangement, waveforms proportional to the current in each phase are supplied by the secondary windings of each current transformer. These waveforms may optionally be passed through a set of three impedance matching isolation transformers T3, which are preferably audio-type signal transformers with low distortion. One end of the secondary winding of the impedance matching isolation transformer corresponding to the phase bus B is connected to the corresponding end of the secondary winding of the phase bus A isolation transformer to subtract the corresponding waveforms. The output of the phase C isolation transformer is amplified in an amplification block 13 and phase-shifted by a phase shifter 15. One output of phase shifter 15 is connected to the other side of the phase B isolation transformer secondary winding to provide the summing required. The desired signal is then available across the other output of the phase shifter, labeled 17, and the other output of the secondary winding of the phase A isolation transformer, labeled 19. Of course, the amplification block 3 could be put on the other side of phase shifter 15. If analog subtraction and addition is not desirable, amplification, addition and subtraction could be done digitally.

Figure 6:
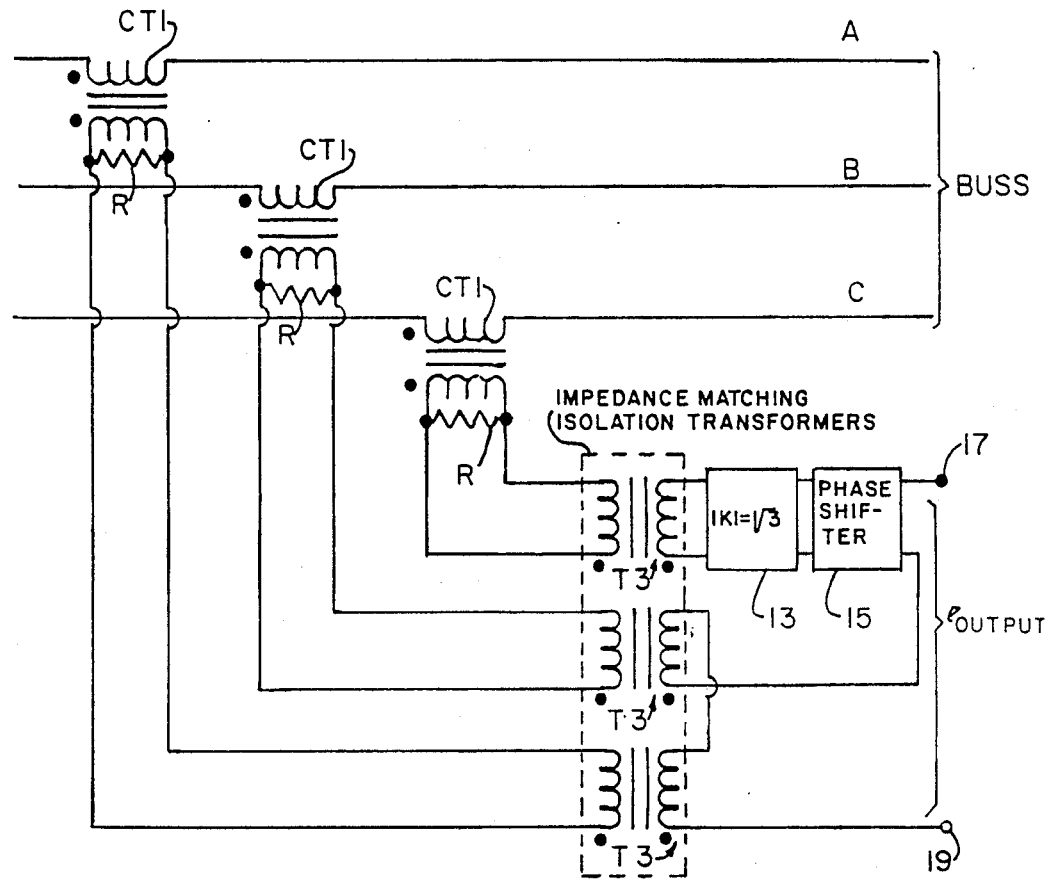
FIG. 6 is an electrical schematic illustrating the apparatus of the present invention.

The circuit shown in FIG. 6 is used for detecting inbound information between phase buses A and B. The circuit of FIG. 6 can be used to extract inbound information present between any two phase buses.

Figure 7:
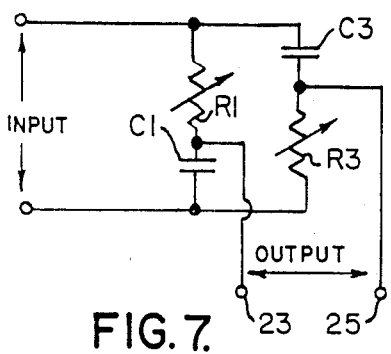
FIG. 7 is an electrical schematic illustrating a phase shifting circuit of the present invention.

Although the present invention is not limited to any particular phase shifter 15, the phase shifting circuit shown in FIG. 7 has been found to be very satisfactory. This circuit is known as an all-pass filter. It consists of two series circuits in parallel with each other, the first series circuit having a resistor R1 in series with a capacitor C1, while the other series circuit has a capacitor C3 in series with a resistor R3, in that order. The phase-shifted waveform appears at a pair of terminals 23 and 25 connected to the midpoints of the respective series circuits. If the resistance of resistor R1 equals that of resistor R3 and the capacitances of capacitors C1 and C3 are also equal, the circuitry of FIG. 7 has the desirable feature that the voltage appearing across the output terminals does not vary with the phase angle. This enables amplification block 13 to be completely independent of phase shifter 15 since the phase shifter in this embodiment does not affect the magnitude of the resulting waveform. If both resistors R1 and R3 are variable (as shown) and ganged together, changing the phase angle is relatively simple. However, for this particular application of extraction of inbound line-to-line information, fixed resistors R1 and R3 provide satisfactory results.

Figure 8:
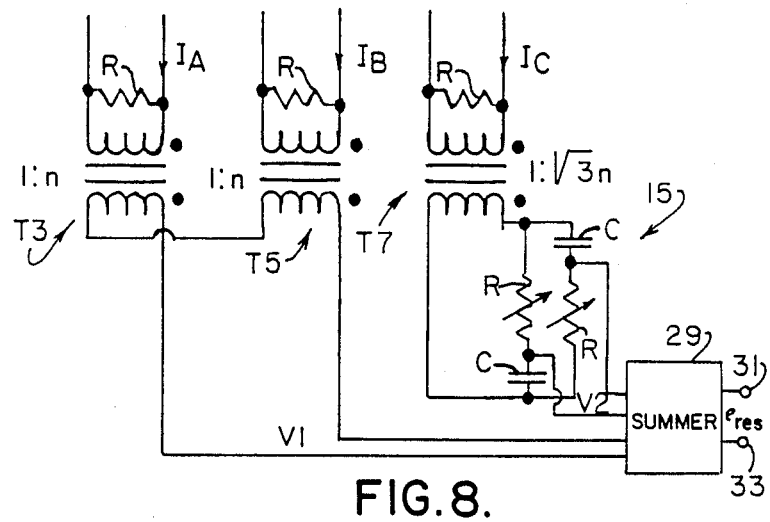
FIG. 8 is an electrical schematic illustrating the apparatus of the present invention, using the phase shifting circuit of FIG. 7.

The phase shifter of FIG. 7 is shown in FIG. 8 in combination with the impedance matching isolation transformers and a summer. In this particular embodiment of the invention, the amplification is accomplished by the impedance matching isolation transformers, labeled T3, T5, and T7. Transformers T3 and T5 have the same turns ratio, namely, 1:n. However, transformer T7, which transforms the current in phase bus C, has a turns ratio of $1:\sqrt{3}n$. Thus, the waveform for the C bus is amplified by a factor of the square root of three more than the corresponding signals from the A and B buses. Transformers T3 and T5 are again connected so that the "B" waveform is subtracted from the "A" waveform, and this difference, labeled V1, is supplied to a summer 29. Also supplied to the summer is the output of phase shifter 15, which is labeled V2. Summer 29 then adds voltages V1 and V2 and gives the result $e_{res}$ across its output terminals 31 and 33.

Figure 9:
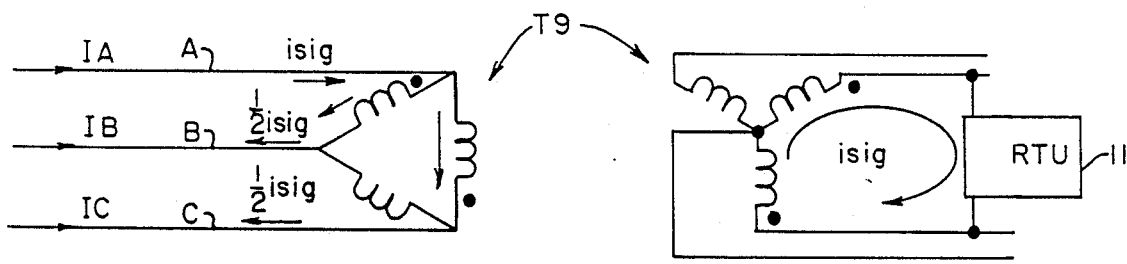
FIG. 9 is an electrical schematic of a third possible system for line-to-line inbound communication.

Extraction schemes such as shown in FIGS. 6 and 8 have been found to perform very well. Unfortunately, in the case of an RTU connected line-to-line across a step-down transformer as shown in FIG. 9, the situation is more complex and the circuits of FIGS. 6 and 8 do not work as well. In the circuit of FIG. 9, remote transponder unit 11 is connected across two windings of a multi-phase step-down transformer T9. When the information is generated line-to-line in this manner, the full signal information $i_{sig}$ appears on phase bus A. One-half of the signal current appears on each of phase buses B and C, with the current on these latter buses flowing in the opposite direction with respect to the current on phase bus A. An analysis similar to that outlined above reveals that under balanced conditions, if one takes the negative of $I_c$, amplifies it by three and rotates it by minus ninety degrees, the net current is $$I_{to} = I_A - I_B + 1.5i_{sig} - \sqrt{3}I_c \angle -90° + 0.5\sqrt{3}i_{sig} = 1.5i_{sig} + 0.5\sqrt{3}i_{sig}$$

Figure 10:
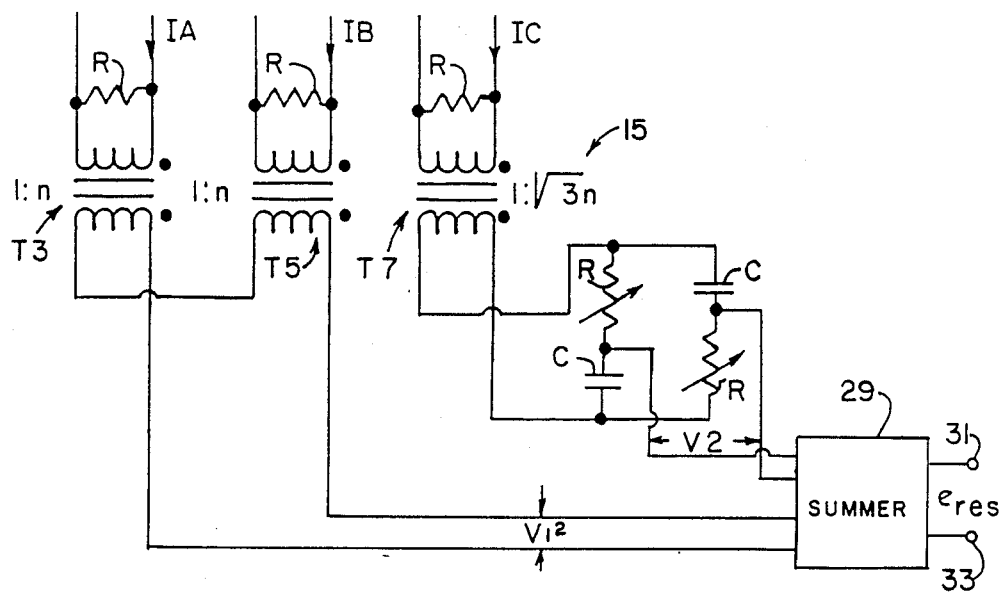
FIG. 10 is an electrical schematic illustrating apparatus of the present invention for use with a communications system as set forth in FIG. 9.

As in the previous case, the current $I_c$ in phase C should be amplified by the square root of three. However, in this case, the amplified waveform is phase-shifted by minus ninety degrees, and subtracted from the difference between currents $I_A$ and $I_B$. The result of this manipulation is $$1.5i_{sig} + 0.5\sqrt{3}i_{sig}$$

which contains only signal components. The implementation of this extraction scheme is shown in FIG. 10. Note that the only differences from the circuit of FIG. 8 is that the leads from transformer T7 to phase shifter 15 have been switched, as have the output leads of the phase shifter to summer 29. The circuitry of FIG. 10 has the further advantage that the result for the previous case remains unchanged when detected by this circuit.

In view of the above, it will be seen that the various objects and features of this invention are achieved and other advantageous results obtained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. Apparatus for extracting inbound information generated line-to-line in a multi-phase electric distribution system, each phase of the distribution system having a voltage waveform thereon whose amplitude and phase is substantially fixed, said voltage waveform functioning as a carrier, said information being inserted as single current pulses onto at least some of the voltage waveforms at fixed locations on said waveforms, said apparatus comprising:

means for deriving waveforms from each primary of a multi-phase electric distribution system, which derived waveforms include at least a carrier component corresponding to the voltage waveform for its associated primary and at least some of which derived waveforms include a signal component; and means for summing the waveforms derived from the primaries;

said waveform deriving means including means for adjusting the amplitude and phase of the waveform derived from at least one primary such that the carrier components of the derived waveforms substantially cancel without cancelling the signal components.

2. Apparatus as set forth in claim 1 wherein the adjusting means includes separate means for changing the phase of the waveform and means for changing the amplitude of the waveform.

3. Apparatus as set forth in claim 2 wherein the phase changing means is an all-pass filter, whereby the phase of the waveform is changed by the phase changing means without changing the waveform's amplitude.

4. Apparatus for extracting inbound information generated line-to-line in a multi-phase electric distribution system comprising:

means for deriving waveforms from each primary of a multi-phase electric distribution system, which derived waveforms include at least a carrier component and at least some of which derived waveforms include a signal component; and means for summing the waveforms derived from the primaries;

said waveform deriving means including means for adjusting the amplitude and phase of the waveform of at least one primary so that the carrier components of the derived waveform substantially cancel;

said adjusting means including separate means for changing the phase of the waveform and means for changing the amplitude of the waveform;

said phase changing means being an all-pass filter, whereby the phase of the waveform is changed by the phase changing means without changing the waveform's amplitude;

said all-pass filter including a pair of resistors having substantially the same value of resistance and a pair of capacitors having substantially the same value of capacitance, one resistor being in series with one of the capacitors and the other resistor being in series with the other capacitor, the two series resistor/capacitor circuits being connected in parallel with the capacitor of one series circuit directly connected to the resistor of the other series circuit so that a waveform impressed across the two series circuits is shifted in phase as measured between the resistor and capacitor of each series circuit.

5. Apparatus as set forth in claim 4 wherein the two resistors are ganged potentiometers, whereby the phase of the waveform is manually adjustable without changing the amplitude of the waveform.

6. Apparatus as set forth in claim 1 wherein the summing means includes means for subtracting at least one derived waveform from another derived waveform.

7. Apparatus as set forth in claim 6 wherein the inbound information is carried on two phase conductors of the electric distribution system, and wherein the subtracting means is configured to provide the difference between the two derived waveforms corresponding to said two-phase conductors.

8. Apparatus for extracting inbound information generated line-to-line in a multi-phase electric distribution system comprising:

means for deriving waveforms from each primary of a multi-phase electric distribution system, which derived waveforms include at least a carrier component and at least some of which derived waveforms include a signal component; and means for summing the waveforms derived from the primaries;

said waveform deriving means including means for adjusting the amplitude and phase of the waveform of at least one primary so that the carrier components of the derived waveforms substantially cancel;

said summing means including means for subtracting at least one derived waveform from another derived waveform;

said inbound information being carried on two phase conductors of the electric distribution system, and said subtracting means being configured to provide the difference between the two derived waveforms corresponding to said two phase conductors;

the derived waveform other than the two waveforms which carry the inbound information being the derived waveform which is adjusted in amplitude and phase by the adjusting means.

9. Apparatus for extracting inbound information generated line-to-line in a multi-phase electric distribution system comprising:

means for deriving waveforms from each primary of a multi-phase electric distribution system, which derived waveforms include at least a carrier component and at least some of which derived waveforms include a signal component; and means for summing the waveform derived from the primaries;

said waveform deriving means including means for adjusting the amplitude and phase of the waveform of at least one primary so that the carrier components of the derived waveforms substantially cancel;

the waveform deriving means including a plurality of transformers, one coupled to each of the primaries of the electric distribution system, at least two of said transformers having substantially equivalent turn ratios and a third of said transformers having a significantly different turn ratio.

10. Apparatus as set forth in claim 9 wherein the turn ratio of the third transformer is approximately a factor of the square root of three different from the turn ratio of said two transformers.

11. Apparatus for extracting inbound information generated line-to-line in a multi-phase electric distribution system comprising:

means for deriving waveforms from each primary of a multi-phase electric distribution system, which derived waveforms include at least a carrier component and at least some of which derived waveforms include a signal component; and means for summing the waveforms derived from the primaries;

said waveform deriving means including means for adjusting the amplitude and phase of the waveform of at least one primary so that the carrier components of the derived waveforms substantially cancel;

the summing means being configured such that the negative of the derived waveform which is adjusted in amplitude and phase is summed with the other derived waveforms.

12. Apparatus as set forth in claim 1 wherein the magnitude of the amplitude adjustment is approximately a factor of the square root of three.

13. Apparatus as set forth in claim 1 wherein the magnitude of the phase adjustment is approximately ninety degrees.

14. The apparatus as set forth in claim 1 wherein first and second waveforms have the same proportionality constant with respect to the current in their respective primaries and wherein the proportionality constant of a third waveform is the square root of three times said proportionality constant.

15. The apparatus as set forth in claim 1 wherein the waveform derived from said at least one primary is shifted in phase from the current in the corresponding primary approximately ninety degrees.

16. The apparatus as set forth in claim 15 wherein the waveform derived from said at least one primary is shifted in phase approximately a positive ninety degrees.

17. The apparatus as set forth in claim 15 wherein the amplitude of the waveform derived from said at least one primary is inverted and the phase shift is approximately minus ninety degrees.

* * * * *